United States Patent [19]

Vinciarelli

[11] Patent Number: 5,555,165
[45] Date of Patent: Sep. 10, 1996

[54] CURRENT DETECTION IN POWER CONVERSION

[75] Inventor: Patrizio Vinciarelli, Boston, Mass.

[73] Assignee: VLT Corporation, San Antonio, Tex.

[21] Appl. No.: 444,825

[22] Filed: May 17, 1995

Related U.S. Application Data

[63] Continuation of Ser. No. 144,636, Oct. 28, 1993, abandoned.

[51] Int. Cl.⁶ .................................................. H02M 3/335
[52] U.S. Cl. ............................................ 363/21; 363/20
[58] Field of Search ................................. 363/20, 21, 62, 363/74, 78, 97, 123, 124, 131

[56] References Cited

U.S. PATENT DOCUMENTS 4,415,959  11/1983  Vinciarelli ................................. 363/21
4,716,515  12/1987  Alexander ................................. 363/138
5,088,016  2/1992  Vinciarelli et al. ....................... 363/15
5,235,502  8/1993  Viciarelli et al. ......................... 363/21
5,291,385  3/1994  Vinciarelli ................................ 363/20
5,297,014  3/1994  Saito et al. ................................ 363/21
5,432,431  7/1995  Vinciarelli et al. ....................... 363/21

FOREIGN PATENT DOCUMENTS

538517-B2  8/1984  Australia .
0014833    9/1980  European Pat. Off. .
0432603    6/1991  European Pat. Off. .
WO-A-
8203302    9/1982  WIPO .

*Primary Examiner*—Matthew V. Nguyen
*Attorney, Agent, or Firm*—Fish & Richardson, P.C.

[57] ABSTRACT

Power is delivered from an input source to a load via a first capacitor in a series of energy transfer cycles, and a rate of change of voltage across the first capacitor is sensed as an indication of current flowing in the first capacitor.

20 Claims, 6 Drawing Sheets

CURRENT DETECTION IN POWER CONVERSION

This application is a file wrapper continuation of U.S. application Ser. No. 08/144,636, filed Oct. 28, 1993, now abandoned

BACKGROUND

This invention relates to current detection in power conversion.

Power supplies include current limiting circuits for several reasons, among them, to protect internal components of the power supply from excessive power dissipation, to protect the source from overload, and to prevent damaging currents from entering a user's wiring and load.

In addition, zero current switching (ZCS) converters of the type described in U.S. Pat. No. 4,415,959, incorporated by reference, must limit their output current for proper operation since there is a value of load current above which zero-crossing will not occur. One such ZCS converter 10, shown in FIG. 1, has a leakage-inductance transformer 12 that transfers power from a primary 11 to a secondary winding 13. The power transfer occurs in a series of energy transfer cycles, where the switching frequency of switch 16 varies the amount of power delivered to the load 20.

Various control schemes may be implemented to keep $I_{choke}$ at or below a maximum value. For example, a resistive shunt 30 may be placed in the serial path which carries $I_{choke}$, as shown in FIG. 3. The voltage across this resistor 30, $V_{shunt}$, indicates $I_{choke}$, and may be input to appropriate control circuitry to limit the value of $I_{choke}$. In other schemes, the output current may be sensed magnetically (e.g., by means of a transformer with a suitable core reset circuit; by means of a Hall-effect device).

SUMMARY

In general, in one aspect, the invention features delivering power from an input source to a load via a first capacitor in a series of energy transfer cycles, and sensing a rate of change of voltage across the first capacitor as an indication of current flowing in the first capacitor.

Embodiments of the invention include the following features. During at least a portion of each of the energy transfer cycles, all of the current delivered to the load is delivered by the first capacitor. The measuring (sensing) is done in a sense capacitor which is connected in parallel with the first capacitor to carry a current which is proportional to the current flowing in the first capacitor. A sense resistor is connected in series with the sense capacitor and the voltage across the sense resistor is provided as a sense output. The capacitance of the sense capacitor is less than half, preferably less than 1%, of the capacitance of the first capacitor. A current fed to the load is controlled in response to the sense output. Energy is transferred to the first capacitor by zero-current switching power conversion, in a succession of energy transfer cycles, each of the energy transfer cycles including a first time period during which energy is transferred to the first capacitor, and a second time period during which energy is transferred from the first capacitor to the load.

In general, in another aspect, the invention features limiting output current of a power converter, by producing a signal indicative of the rate of change of a voltage across a capacitor through which the output current flows, and using the signal to control the output current (e.g., using the signal in a feedback control loop to limit the output current).

Among the advantages of the invention are the following.

The sense circuitry has only an insignificant effect on conversion efficiency. It uses economical, small circuit components in a simple configuration which can be implemented without the need for special manufacturing processes and without the packaging or thermal implications of lossy resistive elements. Other advantages and features will become apparent from the following description and from the claims.

DESCRIPTION

Figure 3:
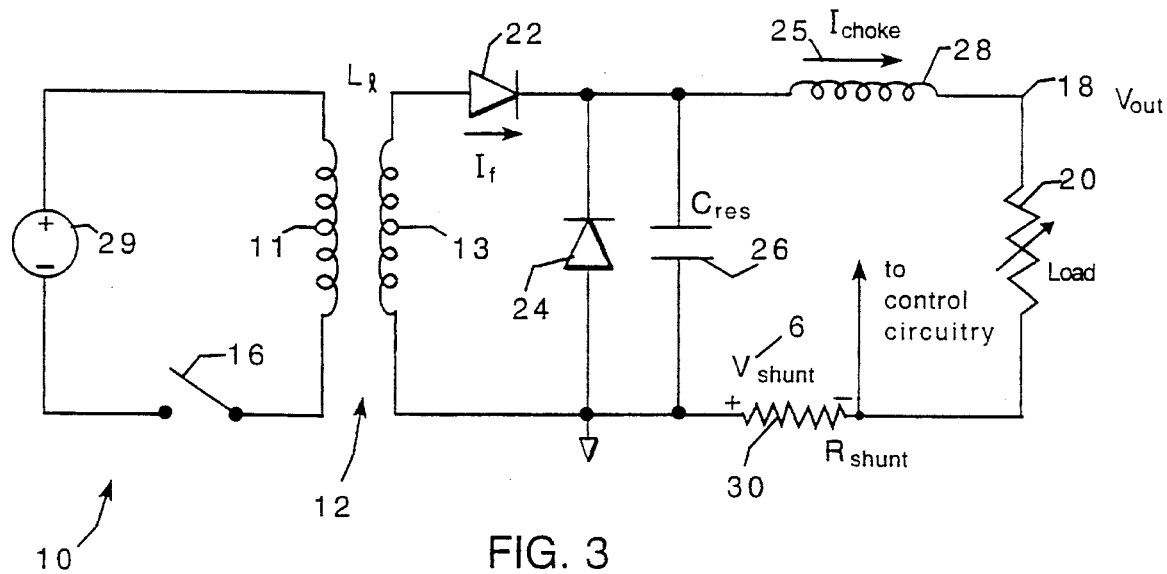
FIG. 3 is a circuit diagram of a power converter which includes a resistive output current measuring device.

In the known current detection scheme of FIG. 3, a resistive element 30 senses the instantaneous value of $I_{choke}$ 25. $V_{shunt}=I_{choke}*R_{shunt}$ and both the instantaneous and average value of $V_{shunt}$ 6 are proportional to the respective values of $I_{choke}$. Therefore, by use of appropriate signal processing circuitry, the voltage $V_{shunt}$ may then be used for: (1) detecting when either the average or instantaneous value of $I_{choke}$ exceeds some predetermined level, and (2) asserting some predetermined control strategy to control the output current to remain at or below some value. This "current-limiting" action is usually required in a power supply to protect either the power supply, or the load, or both, under fault or overload conditions.

The scheme of FIG. 3 is inherently lossy. While in theory it is possible to reduce this loss simply by reducing the value of $R_{shunt}$ 8, this is often not possible in practice. As $R_{shunt}$ is reduced, so too is $V_{shunt}$, and circuitry which can reliably detect very low values of voltage (e.g., below a few tens of millivolts) within the relatively noisy environment of a switching power supply may be complex, costly or unreliable. Thus, there is usually some minimum design value of $V_{shunt}$, $V_{min}$ (e.g., $V_{min}$=50 mV), which is practical for use as a current-limit detection threshold. In a power converter designed to deliver $P_{out}$ Watts at an output voltage 18 equal to $V_{out}$ volts, the loss in the resistive element, $P_{det}$, as a fraction of converter output power rating, can be shown to be:

$$P_{det}/P_{out}=V_{min}/V_{out}.$$

It is noteworthy that, for a fixed $V_{min}$, the loss in the shunt increases as $V_{out}$ drops. With contemporary system voltages trending lower (e.g., to 3.3, 2, and 1 volt), this implies lowered system efficiency. For example, in a converter delivering 5 volts to a load at 300 Watts, with a $V_{min}$ threshold of 50 mV, the loss in the shunt is 1%, or 3 Watts.

On the other hand, for a similar converter delivering 1 volt, the loss is 5%, or 15 Watts.

In a zero-current switching converter, an efficient current measuring scheme takes advantage of the fact that, during a portion of the energy transfer cycle, $I_{choke}$ is exclusively supplied by capacitor 26. Thus, during an energy transfer cycle of the zero-current switching converter of FIG. 1 the load 20 is assumed to be operated at a constant DC voltage, $V_{out}$ (e.g., the load may contain filter capacitors, not shown, which act to reduce time variations in $V_{out}$ to an essentially negligible amount). The value of the output inductor 28 is also assumed to be relatively large in comparison to the secondary-reflected value of the leakage inductance of the transformer 12, $L_1$, so that under steady state load conditions the value of $I_{choke}$ may be considered to be essentially constant over a converter operating cycle.

Figure 1:
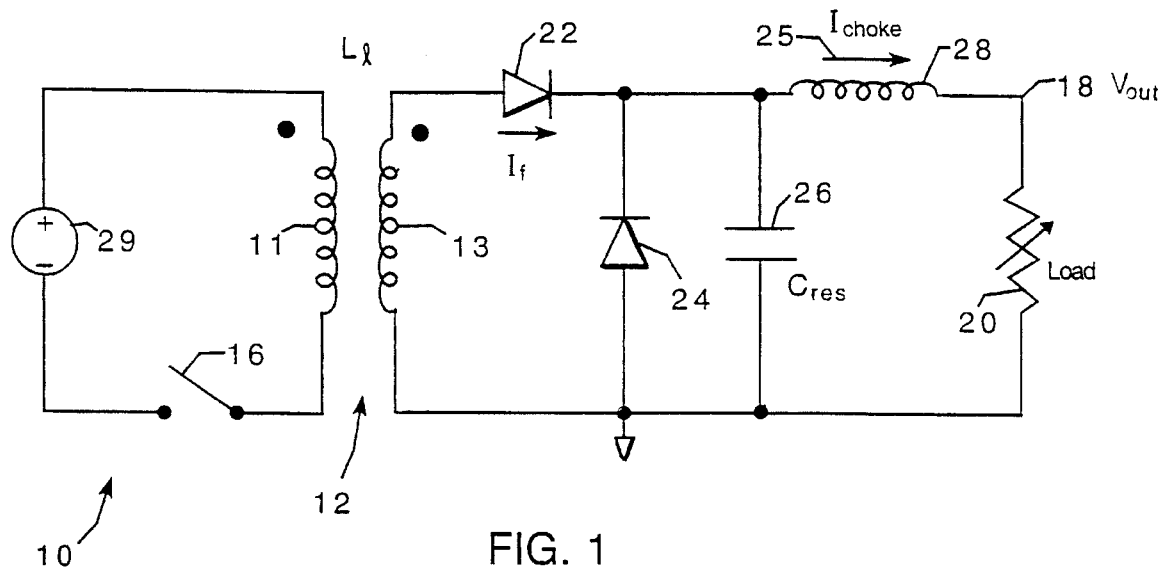
FIG. 1 is a circuit diagram of a zero-current switching power supply.
Figure 2:
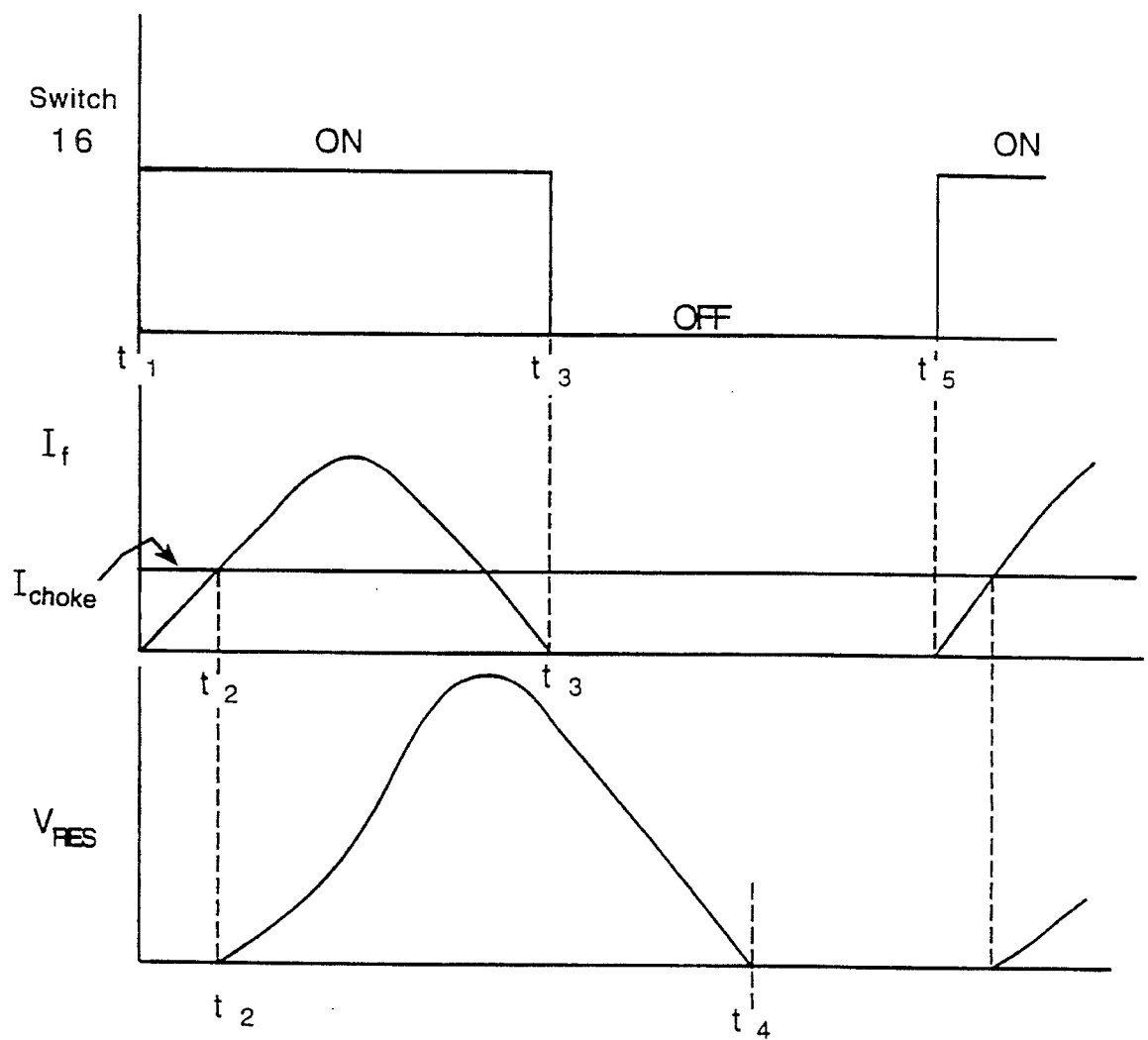
FIG. 2 shows waveforms found during an operating cycle of the converter of FIG. 1.

Waveforms during an energy transfer cycle of the zero-current switching converter of FIG. 1 are illustrated in FIG. 2. Just prior to time $t=t_1$ a value of current, $I_{choke}$ is flowing in the loop formed by the output inductor 28, the load 20, and the diode 24. The diode prevents charging of the capacitor 26, holding the value of the capacitor voltage, $V_{res}$, at essentially zero. At time $t=t_1$, switch 16 is closed. Between time $t=t_1$ and $t=t_2$ the secondary-reflected value of the input source voltage is effectively impressed across the secondary-reflected leakage inductance of the transformer 12 and current in the forward rectifier 22, $I_f$, ramps up to a value equal to $I_{choke}$ as current in the diode 24 ramps down to zero. After time $t=t_2$, the diode 24 ceases conduction and between time $t=t_2$ and $t=t_3$ energy is transferred from the input source to the capacitor 26 via the leakage inductance of the transformer 12. During this time period both the current in the forward rectifier 22 and the voltage across the capacitor 26, $V_{res}$, vary sinusoidally during an energy transfer cycle having a characteristic time scale of $pi*sqrt(L_1*C_{res})$, where $C_{res}$ is the value of capacitor 26. At time $t=t_3$ the current $I_f$ returns to zero and the switch is opened. Between $t=t_3$ and $t=t_4$ the entire current $I_{choke}$ flows in the capacitor 26, discharging the capacitor until the voltage across the capacitor is once again limited to zero volts by diode 24. Thus, during the time period between $t=t_3$ and $t=t_4$ (e.g., the "discharge period") the rate-of-change of voltage, $dV_{res}/dt$, across capacitor 26 is directly proportional to the current $I_{choke}$. Between times $t=t_4$ and $t=t_5$ the current $I_{choke}$ again flows in the loop formed by the output inductor 28, the load 20, and the diode 24. At time $t=t_5$ another cycle begins.

Figure 4:
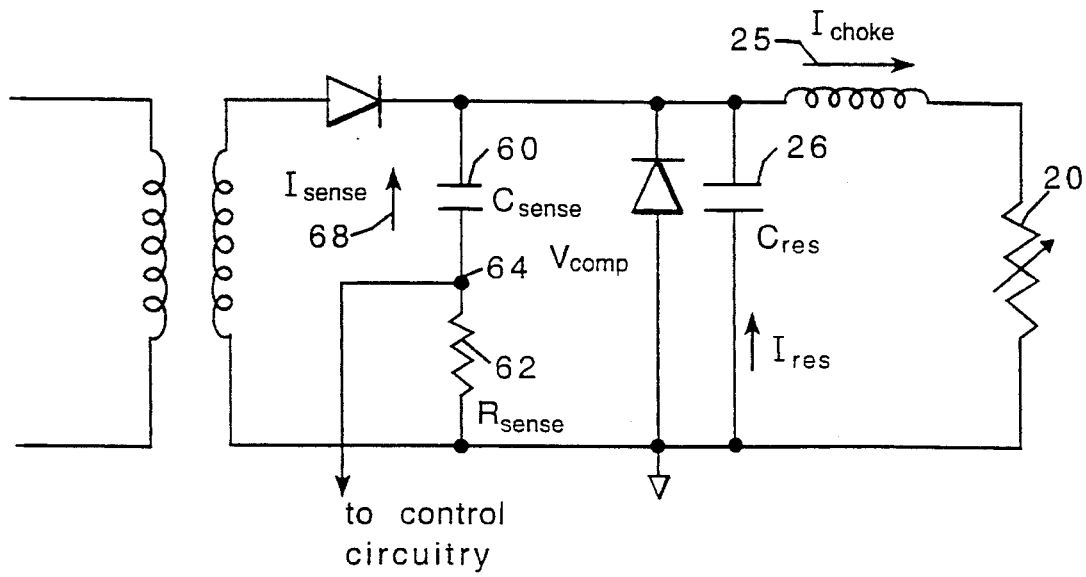
FIG. 4 is a circuit diagram of a zero-current switching power converter which includes an output current detection device.

As shown in FIG. 4, the rate-of-change of $V_{res}$ may be measured by a capacitor 60 in series with a resistor 62, placed in parallel with capacitor 26. Capacitor 60 has a small capacitance $C_{sense}$, compared to that of capacitor 26 $C_{res}$, and the resistance of resistor 62, $R_{sense}$, is small, so that the voltage, $V_{comp}$ 64, across resistor 62 is small compared to the voltage $V_{res}$ 68 across capacitor 26.

In FIG. 4, the sum of the currents, $I_{res}+I_{sense}$, flowing in the capacitors 26, 60 is equal to $I_{choke}$ during the time period $t=t_3$ to $t=t_4$. If, during this discharge period, the instantaneous value of voltage across the sense resistor is small compared to the instantaneous value of $V_{res}$, then the currents may closely approximated by:

$$I_{choke}=I_{sense}+I_{res} \quad (1)$$

$$I_{sense}=C_{sense}(dV_{res}/dt) \quad (2)$$

$$I_{res}=C_{res}(dV_{res}/dt). \quad (3)$$

Combining the preceding three equations, and noting that the voltage across the sense resistor, $V_{comp}$, is equal to:

$$V_{comp}=I_{sense}*R_{sense}$$

results in the close approximation:

$$V_{comp}=R_{sense}*(C_{sense}/(C_{sense}+C_{res}))*I_{choke}. \quad (4)$$

Thus the voltage $V_{comp}$ is proportional to $I_{choke}$ during the discharge period, the constant of proportionality depending on the absolute and relative values of $R_{sense}$, $C_{sense}$ and $C_{res}$. The circuit of FIG. 4 therefore produces a voltage directly proportional to the output current, and, as will be shown below, it can do so without introducing significant energy loss provided the value of $C_{sense}$ is small with respect to the value of $C_{res}$.

Figure 5:
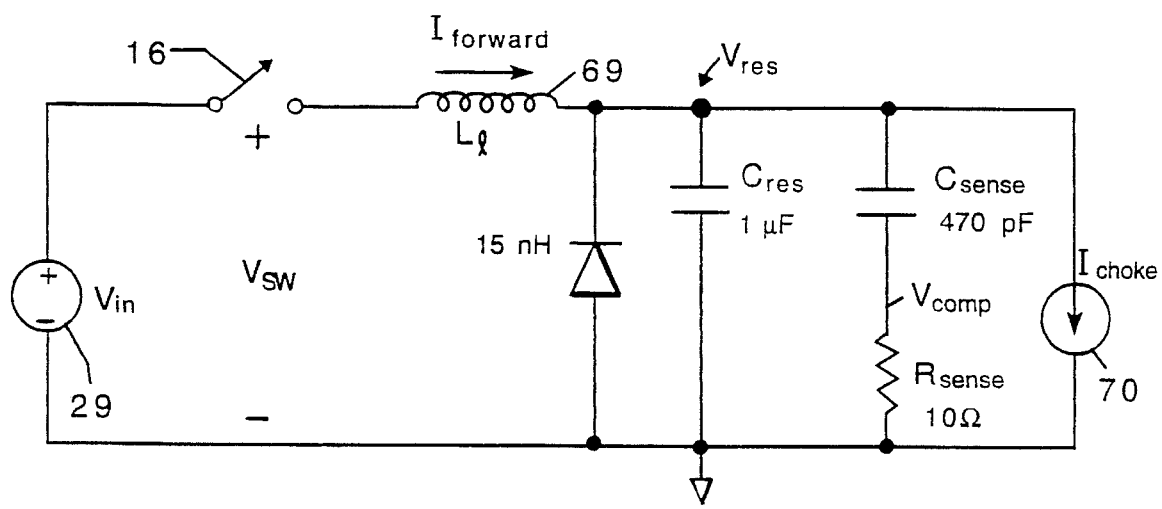
FIG. 5 is a diagram of an equivalent circuit model for a zero-current switching converter.

Operation of the current detection scheme described above may be described with reference to the equivalent circuit model of a zero-current switching converter (FIG. 5). The circuit includes an input voltage source 29 having a value of 15 Volts; a switch 16; an inductance, $L_1$, of 15 nanohenries; a capacitor, $C_{res}$, of value 1 microfarad; a diode 24 in parallel with $C_{res}$; a sense capacitor, $C_{sense}$, of value 470 picofarads; and a sense resistor, $R_{sense}$, of value 10 ohms. The voltage source 29 and leakage inductance 69 are representative either of discrete circuit elements used in a non-isolated converter or of secondary-reflected equivalent circuit values in an isolated converter using a leakage-inductance transformer. In the example, for purposes of illustration, the (normally relatively large) output inductor is replaced with a constant current source 70.

Figure 6:
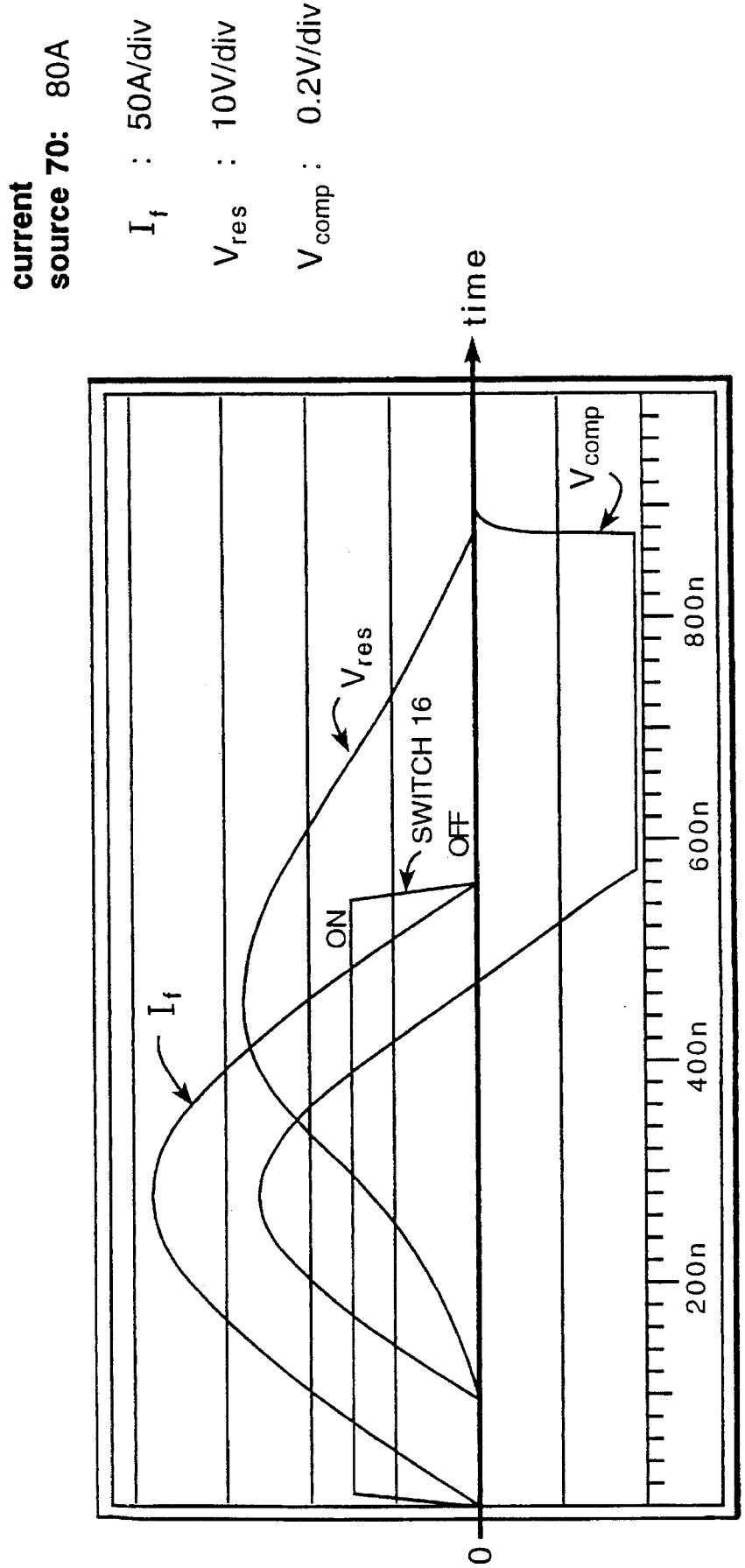
FIGS. 6 and 7 show operating waveforms for the converter and current detection circuitry of FIG. 5.
Figure 7:
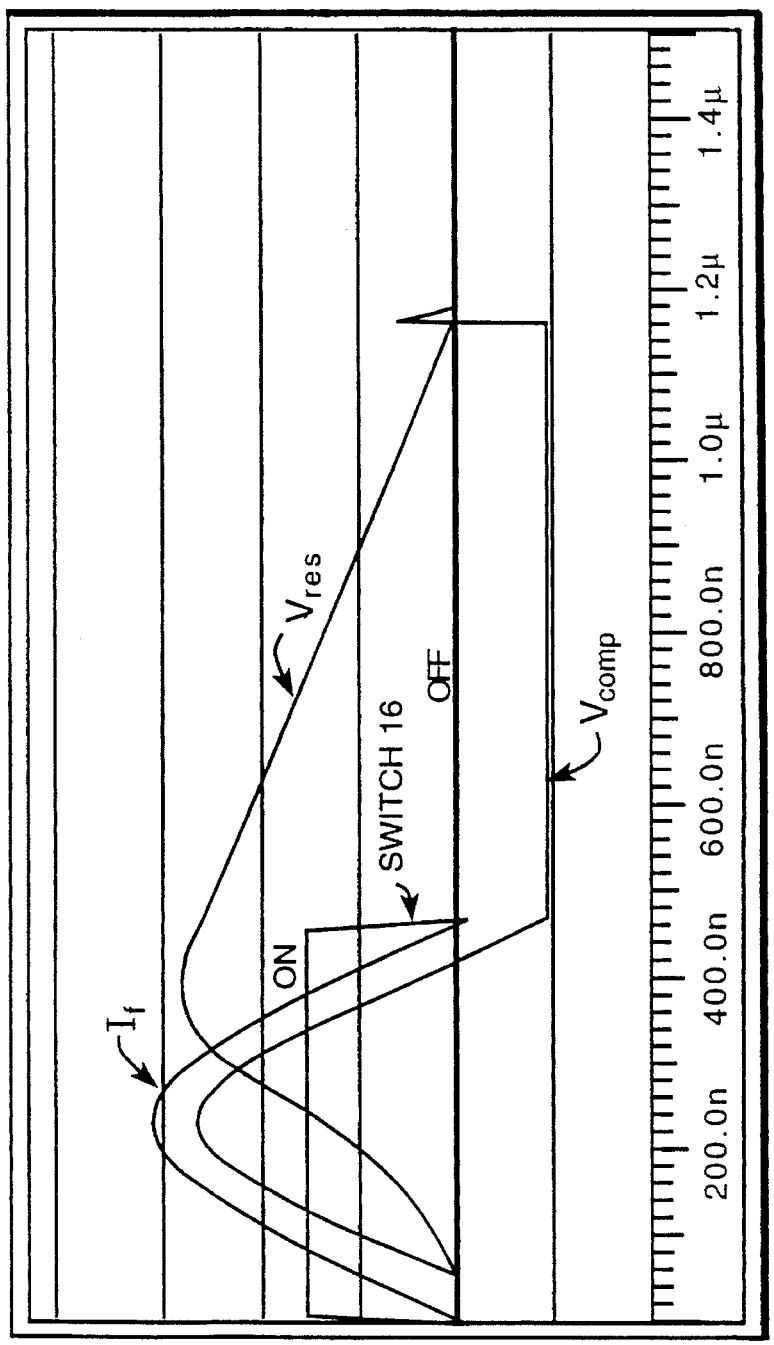

In the waveforms of FIG. 6 the value of the current source is 80 Amperes; in FIG. 7 the value of the current source is 40 Amperes. In both FIGS. 6 and 7 the switch is turned on to initiate an energy transfer cycle and is turned off when the current $I_{forward}$ returns to zero. During the time period beginning when the switch is turned off and ending when the voltage $V_{res}$ declines (linearly) to zero (e.g., the discharge period), the voltage developed at the junction of $C_{sense}$ and $R_{sense}$, $V_{comp}$, is seen to be essentially constant. The values of $V_{comp}$ during this time period are, respectively, −376 millivolts and −188 millivolts, which values are equal to those predicted by Equation 4 for the indicated values of the circuit elements and current sources.

In the examples given above, $I_{choke}$ was assumed to be essentially constant throughout an operating cycle. This assumption was made to simplify the illustration and description of the inventive concepts. However, the concept (of indicating the absolute value of a current, $I_{choke}$, by measuring the rate-of-change of a capacitor voltage during a period of time during which the entire amount of the current flows in the capacitor) is generally applicable to the more typical case in which $I_{choke}$ will exhibit some time variations during the operating cycle (due to the finite value of the output inductor). In such cases the value of $V_{comp}$ will still accurately indicate the absolute value of $I_{choke}$ during the discharge period.

The power dissipated in the current detection circuit of FIG. 5 is less than 0.02 Watts at a converter output current of 80 Amperes, and this essentially negligible loss is achieved despite the fact that a relatively large current sense signal (e.g., close to −0.4 Volt) is generated. This may be compared to a conventional current sense circuit using a resistive shunt. Assume, for example, that it is desired to deliver 80 Amperes to a load at a load voltage of 2 Volts. To achieve a 0.4 Volt current sense signal would result in an unacceptably large shunt dissipation of 32 Watts. If a 50 millivolt current sense signal were used instead, the loss would still be 4 Watts. In either case, the conventional sense circuit will result in a substantial loss in the resistive sense element and a reduction in overall conversion efficiency. The current detection circuit according to the present invention, however, will have an insignificant effect on conversion efficiency and will achieve this result using economical, small, circuit components in a simple circuit configuration which can be implemented without the need for special manufacturing processes (e.g., soldering of shunts) and which have none of the packaging or thermal implications of lossy resistive elements.

Figure 8:
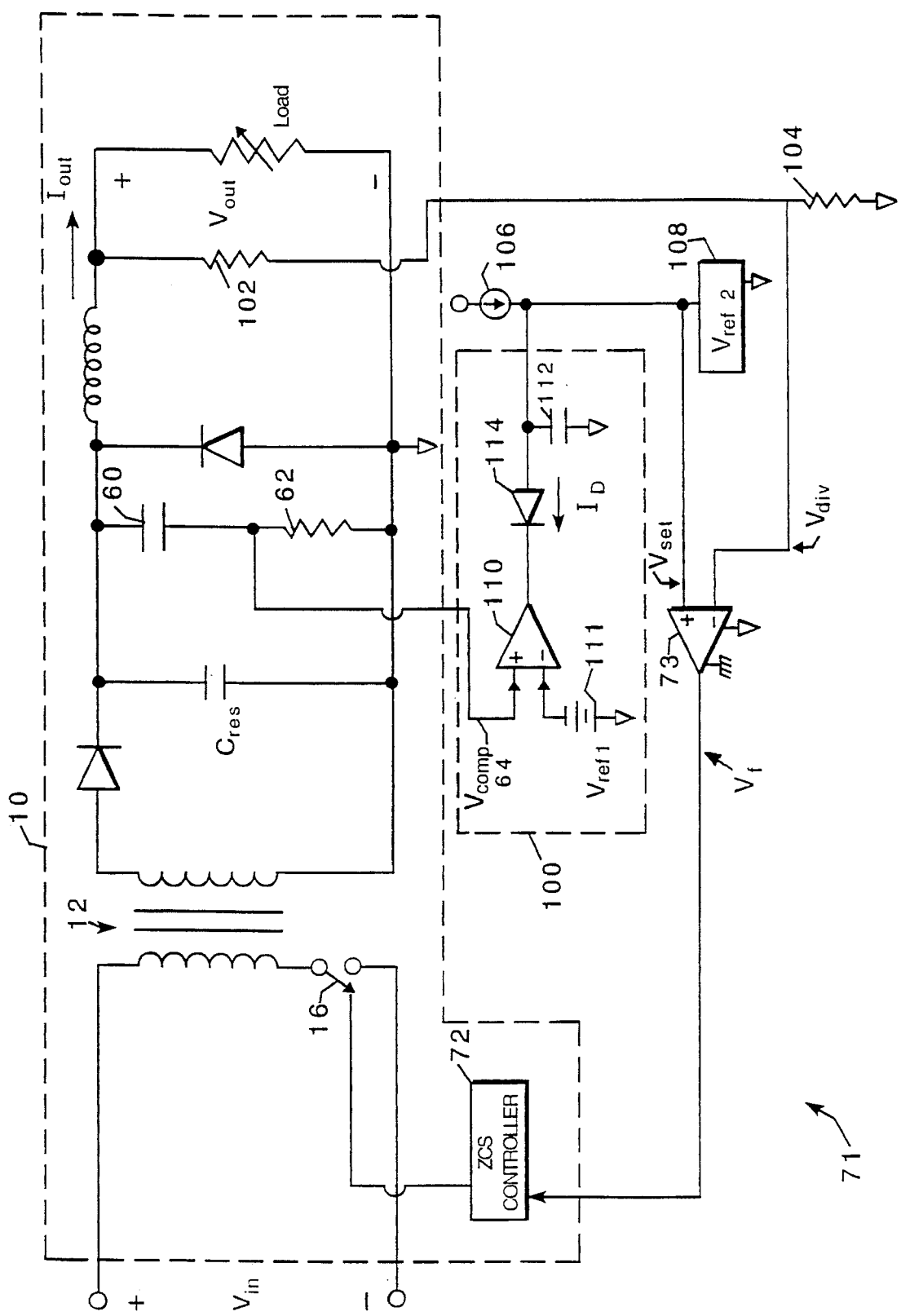
FIG. 8 is a circuit diagram of a zero-current switching converter which includes output voltage and output current control circuitry.

Additional control circuitry, shown included in the power converter 71 of FIG. 8, may be used to control output current $I_{out}$ in response to $V_{comp}$. Power converter 71 includes a zero-current switching power train 10 (of the kind shown in FIG. 4) governed by a zero-current switching controller 72. The controller turns switch 16 on and off at times of zero current at an operating frequency indicated by the signal $V_f$ (which is delivered to the controller by voltage error amplifier 73). The converter 71 includes both an output voltage control loop and a current limit circuit 100. The output voltage control loop consists of a high gain error amplifier 73 which receives two inputs: a voltage value $V_{set}$ and an input from a voltage divider consisting of resistors 102, 104. The voltage $V_{set}$ is generated by current source 106 feeding reference voltage circuit 108. The reference voltage circuit 108 clamps the voltage $V_{set}$ at a predetermined value, $V_{ref2}$. The voltage divider output, $V_{div}$, is a fraction of the converter output voltage $V_{out}$. The error amplifier adjusts the signal $V_f$ so as to maintain the $V_{div}$ essentially equal to $V_{set}$. In this way the output voltage control loop acts to adjust the converter operating frequency so as to maintain $V_{out}$ at an essentially constant value which is dependent upon $V_{ref2}$ and the ratio of the voltage divider resistors.

The signal $V_{comp}$ has the time varying behavior shown in FIGS. 6 and 7, where the negative excursion of the signal subsequent to the switch 16 turning off (referred to hereafter as $V_{neg}$) is indicative of the output current of the converter. This signal is delivered to current limit circuit 100. The high gain, high speed error amplifier 110 compares the signal $V_{comp}$ to a negative reference of value $V_{ref1}$ 111. If the instantaneous value of $V_{comp}$ is positive with respect to $V_{ref1}$, the amplifier 110 will attempt to source current, $I_D$, toward capacitor 112 (and the junction of current source 106 and reference voltage clamp 108). This is prevented, however, by the polarity of the diode 114 connected in series with the output of the amplifier 110. Should $V_{comp}$ become negative with respect to $V_{ref1}$, however, the amplifier will be able to sink current through diode 114 and this will cause current to be shunted away from the reference clamp 108. As the absolute value of $V_{neg}$ increases above $V_{ref1}$ (e.g., as the output current exceeds an output current limit value indicated by $V_{ref1}$) the amplifier will withdraw charge from smoothing capacitor 112 during a portion of each operating cycle and current source 106 will sink charge into the capacitor 112 during the balance of the cycle. This will cause the voltage $V_{set}$ to be pulled below the clamp value $V_{ref2}$ and result in a concomitant reduction in $V_{out}$. Because of the high gain of amplifier 110, the amplifier 110 will withdraw sufficient charge from capacitor 112 during the portion of the operating cycle that $V_{comp}$ is more negative than $V_{ref1}$ to ensure that $V_{set}$ assumes a value (which is below $V_{ref2}$ and smoothed by capacitor 112) which is just sufficient to hold $V_{neg}$ essentially equal to $V_{ref1}$. Thus, if the load is increased, the current limit circuit 100 will act to adjust the converter output voltage to a value which prevents the converter output current from exceeding some predetermined value. For example, if the circuit elements in the power train 10 of FIG. 8 were the same as those cited in the example discussed in conjunction with FIGS. 5, 6, and 7, then the value of $V_{ref1}$ might be set to 390 or 400 millivolts as a means of current limiting the converter output to a value close to 80 Amperes.

Other embodiments are within the following claims. For example, the current limiting circuitry may also be integrated with the control circuitry used to control the output voltage $V_{out}$, e.g., the feedback loop including error amp 73. All, or part, of the circuitry may be embodied as an integrated circuit or hybrid device. The current limiting control circuitry might cause the output current to "fold back" as $V_{out}$ declines in an overload condition.

What is claimed is:

1. Apparatus comprising power conversion circuitry which delivers power from an input source to a load via a first capacitor in a series of energy transfer cycles, and circuitry which measures a value of rate of change of voltage across said capacitor and uses said value to deliver an output which is indicative of a current flowing in the capacitor.

2. The apparatus of claim 1 wherein, during at least a portion of each of said energy transfer cycles, all of the current delivered to said load is delivered by said first capacitor.

3. The apparatus of claim 1 wherein said circuitry is connected to carry a current which is proportional to the current flowing in said first capacitor.

4. The apparatus of claim 1 wherein said circuitry is connected in parallel with said capacitor and comprises a sense capacitor.

5. The apparatus of claim 4 wherein said circuitry comprises a sense resistor in series with said sense capacitor and wherein said output comprises the voltage across said sense resistor.

6. The apparatus of claim 5 wherein said sense capacitor has a capacitance which is smaller than the capacitance of said first capacitor.

7. The apparatus of claim 6 wherein said sense capacitor has a capacitance which is less than half, preferably less than 1%, of the capacitance of said first capacitor.

8. The apparatus of claim 1 further comprising a controller for controlling a current fed to said load in response to said output of said circuitry.

9. The apparatus of claim 1 wherein power conversion circuitry connected to transfer energy to said load during a succession of energy transfer cycles, each of said energy transfer cycles comprising a first time period during which energy is transferred to said first capacitor, and a second time period during which energy is transferred from said first capacitor to said load.

10. The apparatus of claim 1 wherein said power conversion circuitry comprises zero-current switching conversion circuitry.

11. Apparatus comprising a first capacitor connected to feed a load, a rate of change of voltage across said capacitor being indicative of current flowing in said first capacitor, and circuitry which measures a value of said rate of change of voltage and uses said value to deliver an output which is indicative of the current flowing in said capacitor.

12. The apparatus of claim 11 wherein said circuitry comprises a sense capacitor and a sense resistor in series, said sense capacitor having a capacitance which is less than half of the capacitance of said first capacitor, said series connected capacitor and resistor being connected in parallel with said first capacitor to share a portion of said current flowing in said first capacitor, a voltage across said sense resistor being an output indicative of the rate of change of voltage across said first capacitor.

13. A method for use in power conversion comprising delivering power from an input source to a load via a first capacitor in a series of energy transfer cycles, and measuring a value of rate of change of voltage across said first capacitor and using said value as an indication of current flowing in said first capacitor.

14. The method of claim 13 wherein said measuring comprises measuring a current, flowing through circuitry connected across said first capacitor, which is proportional to said current flowing in said first capacitor.

15. The method of claim 14 wherein said circuitry connected across said first capacitor comprises a sense capacitor in series with a sense resistor.

16. The method of claim 15 wherein said measuring comprises detecting the voltage across said sense resistor as an indication of current in said first capacitor.

17. The method of claim 13 further comprising controlling a current fed to said load in response to said indication of said current flowing in said first capacitor and said load.

18. The method of claim 13 further comprising transferring energy to said load during a succession of energy transfer cycles, each of said energy transfer cycles comprising a first time period during which energy is transferred to said first capacitor, and a second time period during which energy is transferred from said first capacitor to said load.

19. A method for limiting output current of a power converter, the method comprising producing a signal indicative of a value of rate of change of a voltage across a capacitor through which at least some output current flows, and using the signal to control the output current.

20. The method of claim 19 wherein said signal is delivered in a feedback control loop to limit the output current.

* * * * *